(12) United States Patent
Wallrabe et al.

(10) Patent No.: US 10,596,897 B2
(45) Date of Patent: Mar. 24, 2020

(54) MULTI-PART AIR DUCT FOR A MOTOR VEHICLE AND MOTOR VEHICLE HAVING AN AIR DUCT OF THIS TYPE

(71) Applicant: Dr. Ing. h.c. F. Porsche Aktiengesellschaft, Stuttgart (DE)

(72) Inventors: Sven Wallrabe, Leonberg (DE); Markus Keller, Leonberg (DE); Robert Bona, Sindelfingen (DE); Eberhard Palmer, Vaihingen/Enz (DE); Niklas Neuschwanger, Schwieberdingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 15/701,809

(22) Filed: Sep. 12, 2017

(65) Prior Publication Data

US 2018/0072151 A1    Mar. 15, 2018

(30) Foreign Application Priority Data

Sep. 12, 2016   (DE) .......................... 10 2016 117 058

(51) Int. Cl.
*B60K 11/08*    (2006.01)
*B60K 11/02*    (2006.01)

(52) U.S. Cl.
CPC .............. *B60K 11/08* (2013.01); *B60K 11/02* (2013.01); *B60Y 2410/113* (2013.01); *B60Y 2410/122* (2013.01)

(58) Field of Classification Search
CPC ................................. B60K 11/02; B60K 11/08
See application file for complete search history.

(56) References Cited

U.S. PATENT DOCUMENTS

| 8,485,295 | B2* | 7/2013 | Mildner | B62D 25/084 180/68.1 |
| 8,561,741 | B2 | 10/2013 | Kurokawa et al. | |
| 8,936,121 | B2* | 1/2015 | Vacca | B60K 11/04 165/44 |
| 9,376,087 | B2* | 6/2016 | Schmid | B60K 11/08 |
| 2004/0038018 | A1* | 2/2004 | Anderson | C08J 9/122 428/304.4 |
| 2010/0229487 | A1* | 9/2010 | Lewis | E04B 1/7654 52/408 |
| 2011/0000728 | A1 | 1/2011 | Mildner | |
| 2012/0043051 | A1 | 2/2012 | Kurokawa et al. | |

(Continued)

FOREIGN PATENT DOCUMENTS

| CN | 204452639 | 8/2015 |
| CN | 105829199 | 8/2016 |

(Continued)

OTHER PUBLICATIONS

Korean Notice of Preliminary Rejection dated Jul. 31, 2018.
Chinese Office Action dated Sep. 3, 2019.

*Primary Examiner* — James A Shriver, II
*Assistant Examiner* — Steve Clemmons
(74) *Attorney, Agent, or Firm* — Gerald E. Hespos; Michael J. Porco; Matthew T. Hespos

(57) ABSTRACT

A multi-part air duct (10) for a motor vehicle has a lower foam part (11), an upper foam part (12), and lateral injection moldings (13, 14). The injection moldings (13, 14) connect the lower foam part (11) to the upper foam part (12) on both sides.

4 Claims, 4 Drawing Sheets

(56) References Cited

U.S. PATENT DOCUMENTS

| | | | |
|---|---|---|---|
| 2012/0193156 A1* | 8/2012 | Hirano | B60K 11/08 |
| | | | 180/68.1 |
| 2015/0076859 A1 | 3/2015 | Beierl et al. | |
| 2017/0043659 A1* | 2/2017 | Vacca | B60K 11/08 |
| 2017/0204773 A1* | 7/2017 | Tucker | F01P 7/02 |
| 2017/0246949 A1* | 8/2017 | Roussel | B60K 11/08 |

FOREIGN PATENT DOCUMENTS

| | | | | |
|---|---|---|---|---|
| DE | 4343680 C1 * | 5/1995 | | B60K 11/04 |
| FR | 2995567 B1 * | 1/2016 | | B60K 11/08 |
| KR | 1020110138405 A | 12/2011 | | |
| KR | 1020160019211 A | 2/2016 | | |
| WO | 2014/044962 | 3/2014 | | |
| WO | 2015091224 | 6/2015 | | |
| WO | 2016016549 A1 | 2/2016 | | |

* cited by examiner

MULTI-PART AIR DUCT FOR A MOTOR VEHICLE AND MOTOR VEHICLE HAVING AN AIR DUCT OF THIS TYPE

CROSS REFERENCE TO RELATED APPLICATION

This application claims priority under 35 USC 119 to German Patent Appl. No. 10 2016 117 058.5 filed on Sep. 12, 2016, the entire disclosure of which is incorporated herein by reference.

BACKGROUND

1. Field of the Invention

The invention relates to a multi-part air duct for a motor vehicle. The invention further relates to a method for producing an air duct, and to a corresponding motor vehicle with such an air duct.

2. Description of the Related Art

Deviations from the thermodynamic cycle process in an internal combustion engine give rise to waste heat that is discharged to the walls of the combustion chamber and the cylinder. An excessive operating temperature can, however, promote separation of the lubricating film or burning of the valves, and thus damage the engine. A wide variety of cooling systems for removing heat produced in internal combustion engines are known.

Motor vehicles of the prior art have different types of air ducts. In the present context, this should be understood as meaning all parts of the vehicle that determine the movement direction of the air and that establish a flow connection between air inlet openings and individual cooling components—for example heat exchangers of various cooling circuits of the motor vehicle.

DE 10 2009 031 746 A1 describes a cooling-air duct device for a motor vehicle that is arranged in front of the radiator with respect to the direction of travel of the vehicle. The cooling-air duct device of DE 10 2009 031 746 A1 has a first duct component and a second duct component arranged upstream of the first duct component and is composed of a material that is relatively easy to deform.

SUMMARY

The invention provides a multi-part air duct for a motor vehicle, a method for producing an air duct, and a motor vehicle.

The invention relates to a multi-part air duct with injection moldings on the sides and of foam parts above and below. The resulting product is lightweight and has the advantage of increased packing density for transport and thus better logistics.

The injection moldings can be joined to the foam parts by a clip connection and spring elements. Snap elements of this type can be produced from thermoplastics that are suitable for the injection molding, without significant additional expenditure on materials and production, and provide structural freedom.

The lower foam part can be equipped with film hinges to facilitate the transport and assembly process. The upper foam part may be formed so that back flow of air is avoided as a result of the foam part bearing against the radiator externally.

One exemplary embodiment of the invention is illustrated in the drawings and is described in more detail below.

DETAILED DESCRIPTION

Figure 1:
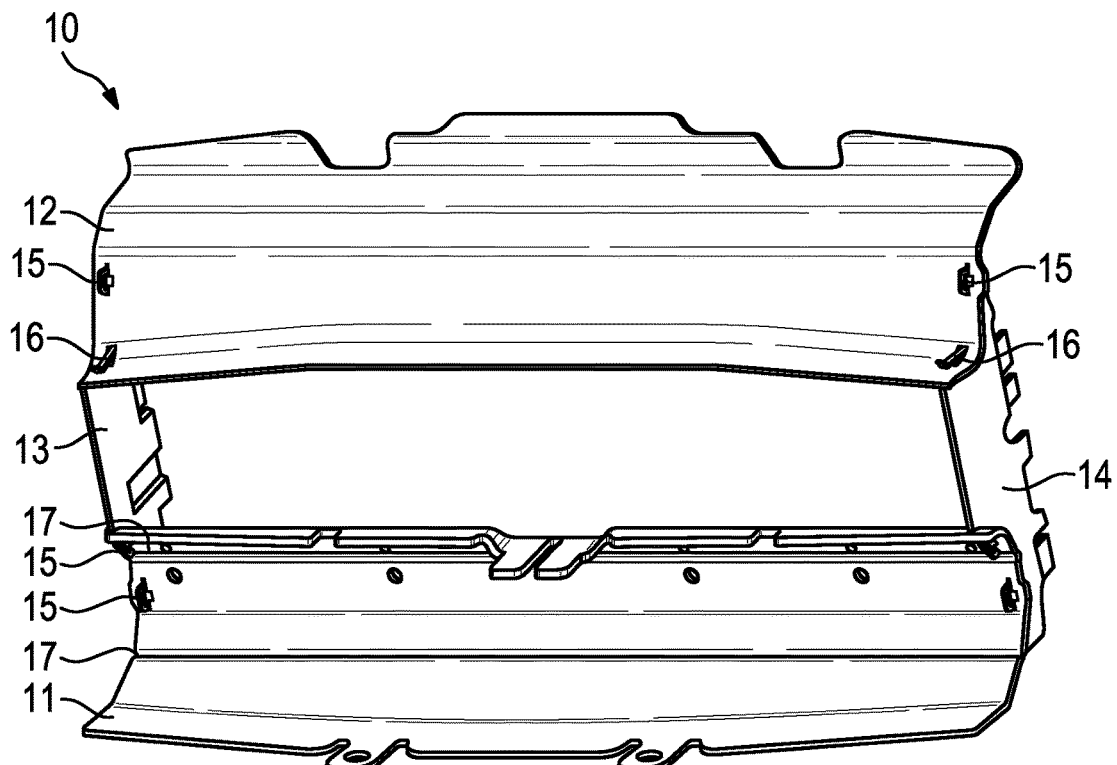
FIG. 1 is a first perspective view of an air duct according to the invention.
Figure 2:
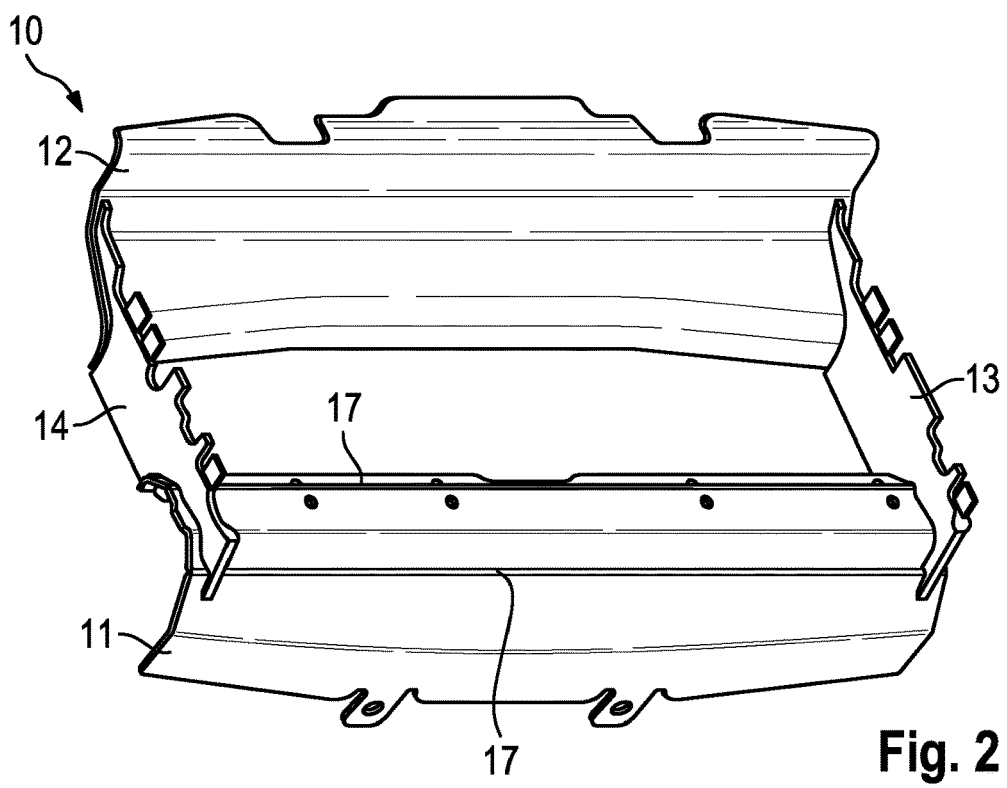
FIG. 2 is a second perspective view of the air duct.

When viewed in combination, FIGS. 1 and 2 illustrate the basic structural features of an air duct 10 according to the invention. Based on its intended position in a motor vehicle, this air duct 10 comprises a lower foam part 11, an upper foam part 12, and lateral injection moldings 13, 14 that connect the lower foam part 11 to the upper foam part 12 on both sides.

Figure 3:
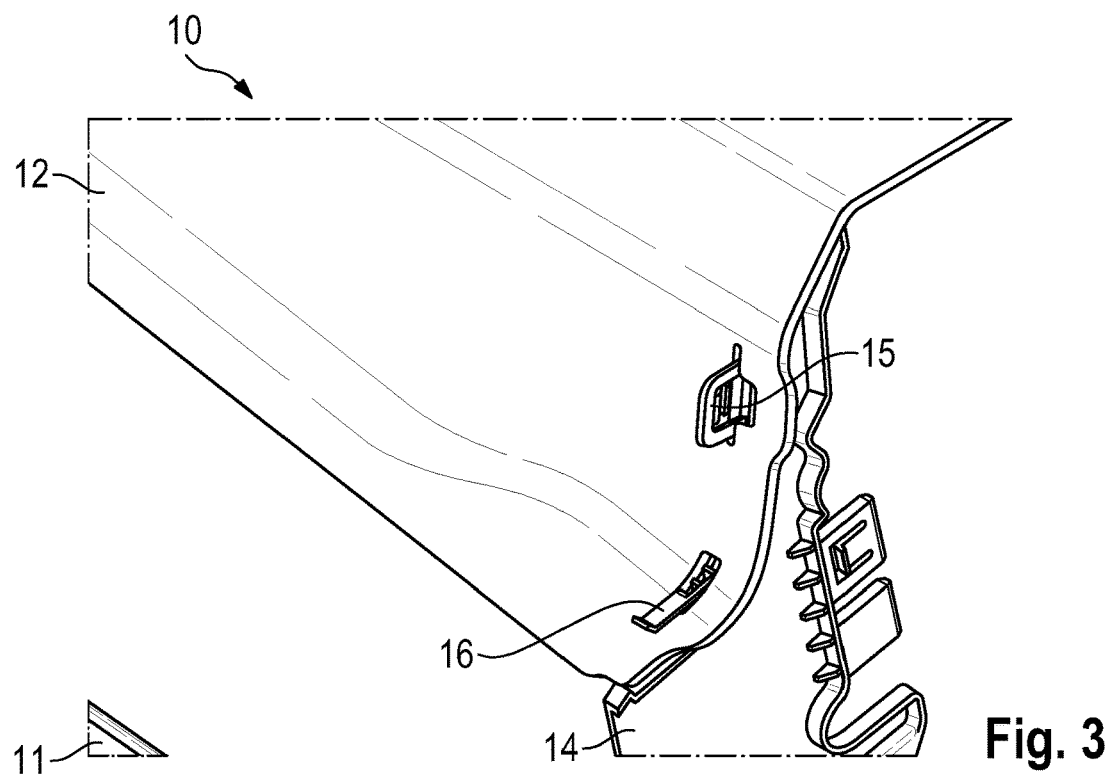
FIG. 3 shows a first detail of the air duct.
Figure 4:
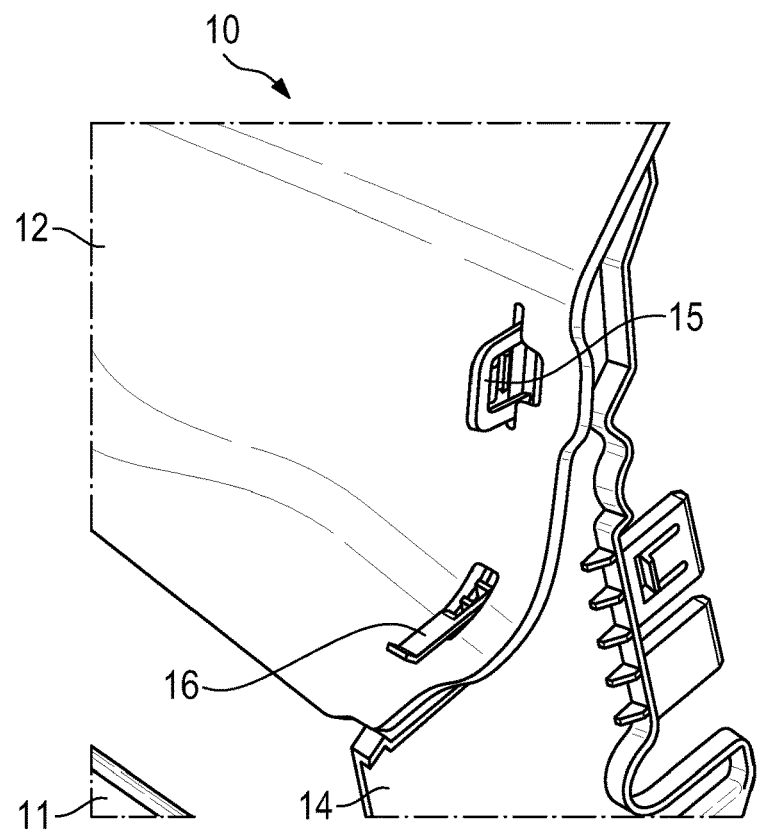
FIG. 4 shows a second detail of the air duct.
Figure 5:
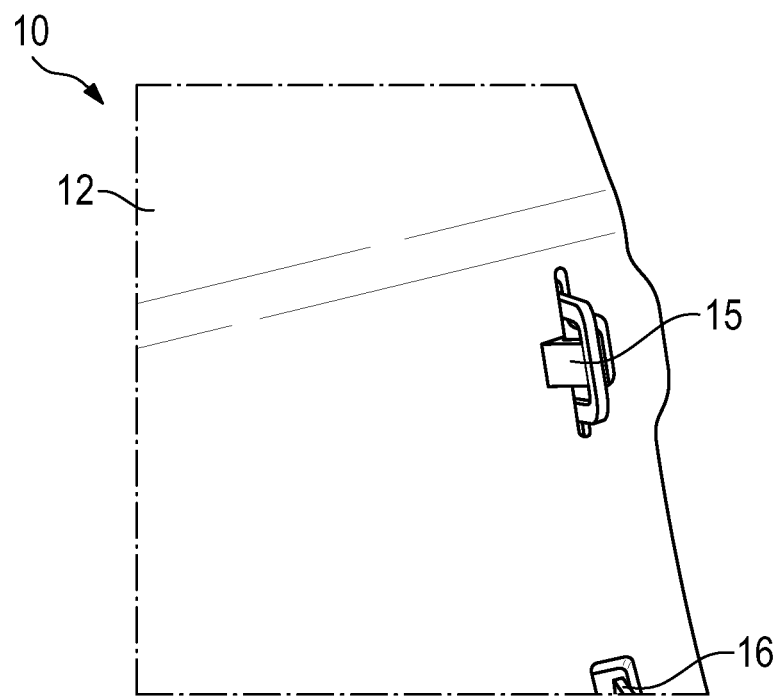
FIG. 5 shows a third detail of the air duct.

FIGS. 3, 4 and 5 illustrate the snap connection between the upper foam part 12 on one side and the injection molding 14 shown in FIG. 1 on the right—and thus in FIG. 2 on the left—on the other side. FIGS. 3 and 4 show a snap hook 16 that can be expanded resiliently by pushing in the upper foam part 12. In this way, after being pushed in completely, the upper foam part 12 is tensioned elastically against a projection formed in the injection molding 14. As a result, a force-fitting and form-fitting connection arises between the foam part 12 and the injection molding 14.

The detail of FIG. 5 highlights one of the clips 15 used in the upper region of the air duct 10. The clip 15, in its end position (shown in the drawing), connects the upper foam part 12 and the injection molding 14 in a further direction of action in a form-fitting manner. However, other joining methods—for example screwing, clipping, clamping, or otherwise joining by pressing on or in within the meaning of DIN 8593-3—suitable for the connecting partners 11, 12, 13, 14 may be used, without departing from the scope of the invention.

Figure 6:
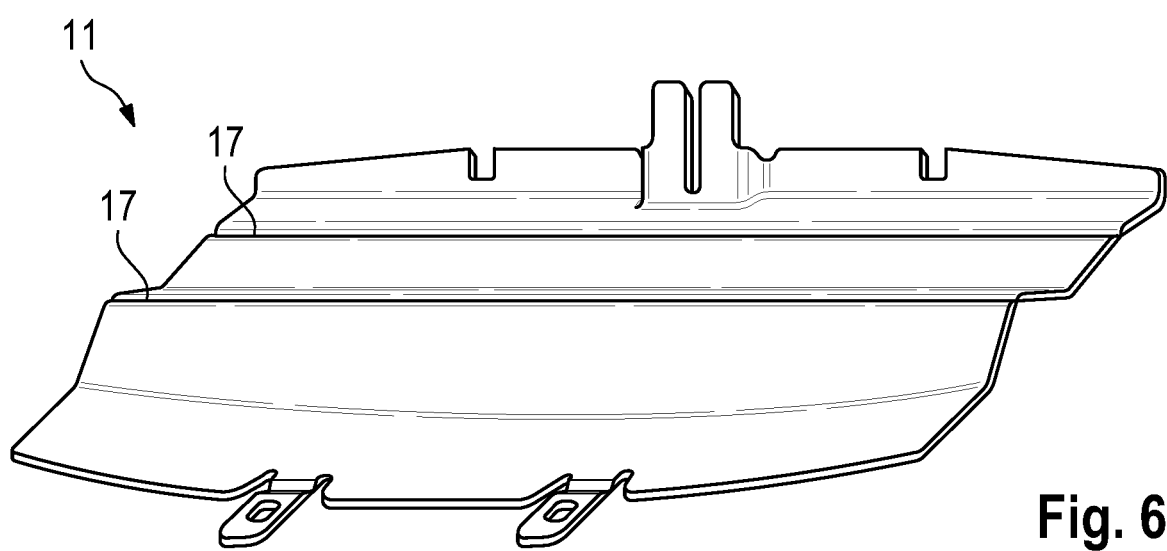
FIG. 6 is a first perspective view of a lower foam part of the air duct.
Figure 7:
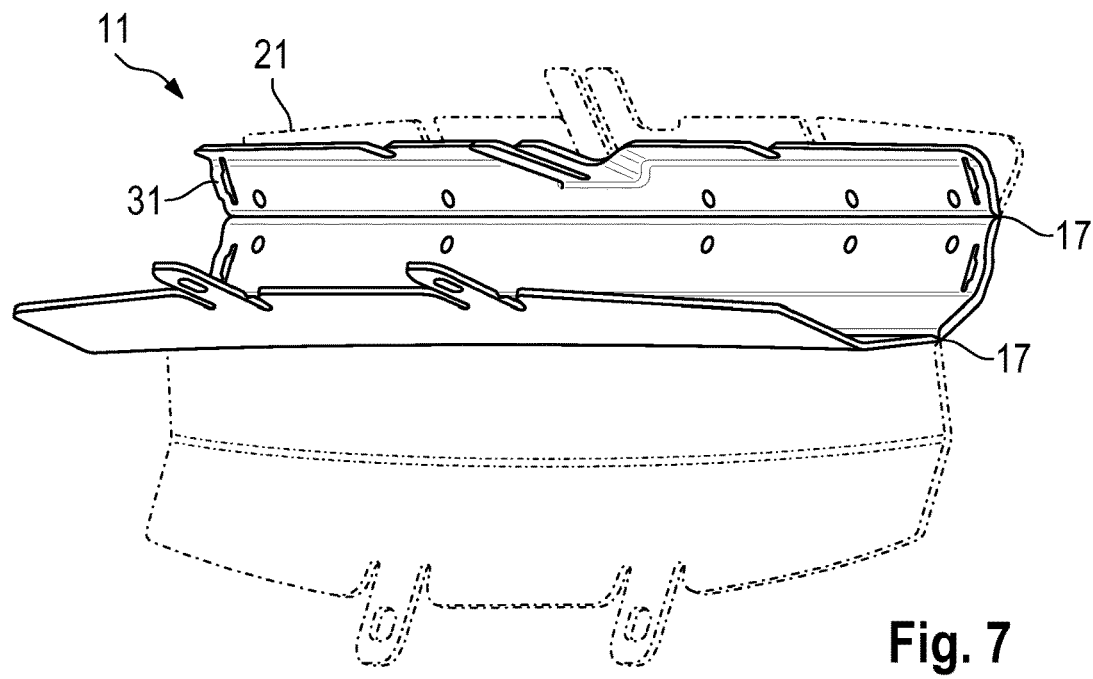
FIG. 7 is a second perspective view of the lower foam part

FIG. 6 shows the lower foam part 11 on its own. Film hinges 17 extend parallel to one another and allow the lower foam part 11 to twist between the alternative configurations 21, 31 indicated in FIG. 7 can be seen.

Figure 8:
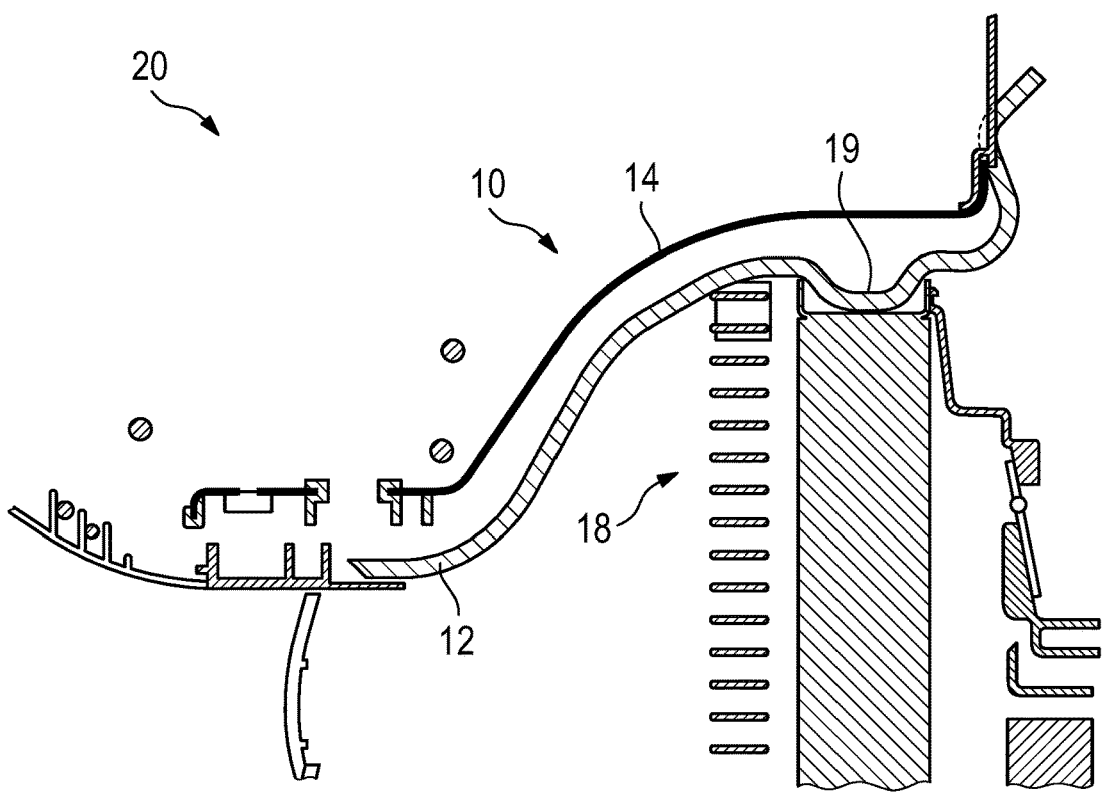
FIG. 8 is in longitudinal section a motor vehicle according to the invention.

Finally, FIG. 8 illustrates the design of the upper foam part 12 on the basis of its intended installation position in the motor vehicle 20. A bulge 19 can be seen in the upper region of the part and permits the air duct 10 to bear directly externally against the radiator 18 during production.

What is claimed is:

1. An air duct for a motor vehicle, comprising:
a lower foam part having spaced apart first and second side edges and first and second lower openings formed in the lower foam part at positions in proximity to the respective first and second side edges of the lower foam part;
an upper foam part spaced from the lower foam part, the upper foam part having spaced apart first and second side edges and first and second upper openings formed in the upper foam part at positions in proximity to the respective first and second side edges of the upper foam part;
a first lateral injection molding extending between areas of the lower and upper foam parts in proximity to the respective first side edges thereof, an upper end of the first lateral injection molding being formed with an upper snap hook that passes through the first upper opening of the upper foam part, and a lower end of the first lateral injection molding being formed with a lower snap hook that passes through the first lower opening of the lower foam part so that the upper and lower foam parts are tensioned elastically in position on the first lateral injection molding; and a second lateral injection molding extending between areas of the lower and upper foam parts in proximity to the respective second side edges thereof, an upper end of the second lateral injection molding being formed with an upper snap hook that passes through the second upper opening of the upper foam part, and a lower end of the second lateral injection molding being formed with a lower snap hook that passes through the second lower opening of the lower foam part so that the upper and lower foam parts are tensioned elastically in position on the second lateral injection molding.

2. The air duct of claim 1, wherein the lower foam part comprises parallel film hinges enabling at least areas of the lower foam part to be rotated between a substantially planar orientation for transport and a non-planar orientation for assembly onto the first and second lateral injection moldings.

3. A motor vehicle, comprising a radiator, and the air duct of claim 1.

4. The motor vehicle of claim 3, wherein the upper foam part of the air duct has a bulge that bulges inwardly on the air duct and bears against an external surface of a radiator.

* * * * *